US006987609B2

(12) United States Patent
Tischer et al.

(10) Patent No.: US 6,987,609 B2
(45) Date of Patent: Jan. 17, 2006

(54) MICROSCOPE

(75) Inventors: Christian Tischer, Heidelberg (DE);
Ernst-Ludwig Florin, Gaiberg (DE)

(73) Assignee: Europaisches Laboratorium fur Molekularbiologie (EMBL), Heidelberg (DE)

( * ) Notice: Subject to any disclaimer, the term of this patent is extended or adjusted under 35 U.S.C. 154(b) by 0 days.

(21) Appl. No.: 10/488,769

(22) PCT Filed: Sep. 4, 2002

(86) PCT No.: PCT/EP02/09901

§ 371 (c)(1),
(2), (4) Date: Mar. 5, 2004

(87) PCT Pub. No.: WO03/023483

PCT Pub. Date: Mar. 20, 2003

(65) Prior Publication Data

US 2004/0240046 A1    Dec. 2, 2004

(30) Foreign Application Priority Data

Sep. 5, 2001   (DE) ............................. 101 43 481

(51) Int. Cl.
    *G02B 21/06*   (2006.01)
(52) U.S. Cl. ........................................ 359/385
(58) Field of Classification Search ......... 359/368, 359/385, 387, 388, 389, 390
    See application file for complete search history.

(56) References Cited

U.S. PATENT DOCUMENTS 4,783,159 A    11/1988   Takagi et al.

5,126,877 A    6/1992    Biber
5,493,443 A    2/1996    Simon et al.

(Continued)

FOREIGN PATENT DOCUMENTS

DE    42 43 144 A1    6/1994
DE    40 28 605 C2    9/1997
DE    198 42 153 A1   3/2000

(Continued)

OTHER PUBLICATIONS

Patent Abstracts of Japan, vol. 1998, No. 9, Jul. 31, 1998.

(Continued)

*Primary Examiner*—Mark A. Robinson
(74) *Attorney, Agent, or Firm*—Rothwell Figg Ernst & Manbeck (57) ABSTRACT

The invention relates to a microscope comprising a microscope housing (18), an optics system (16) consisting of at least one lens system that contains at least one respective lens (48) and is positioned at one end of a passage (19) of the microscope housing (18), at least one observation device, in particular an ocular, located at the other end of the passage (19), an illumination device, whose light forms at least one illumination beam (44), originating from a plane of incidence (45) that vertically intersects the passage (19), said beam traversing the lens system and striking an object carrier (36) at a predetermined angle (β). According to the invention, the illumination beam or beams (44) originating from the plane of incidence (45) is/are provided by an optical device, whose cross-section lying in the vicinity of the passage (19) is substantially smaller than the cross-section of said passage (19).

35 Claims, 8 Drawing Sheets

U.S. PATENT DOCUMENTS

| | | | |
|---|---|---|---|
| 5,675,145 A | 10/1997 | Toda et al. | |
| 5,859,727 A * | 1/1999 | Tsuchiya | 359/387 |
| 6,313,944 B2 * | 11/2001 | Kawahito | 359/388 |
| 6,751,018 B2 * | 6/2004 | Kawano et al. | 359/387 |
| 6,819,484 B2 * | 11/2004 | Aono et al. | 359/368 |

FOREIGN PATENT DOCUMENTS

| | | |
|---|---|---|
| EP | 1 109 046 A | 6/2001 |
| JP | 10 096862 A | 4/1998 |
| WO | WO 00 50878 A | 8/2000 |

OTHER PUBLICATIONS

Tokunaga M., et al., "Single Molecule Imaging of Fluorophores and Enzymatic Reactions Achieved by Objective-Type Total Internal Reflection Fluorescence Microscopy", Biochemical and Biophysical Research Communications, vol. 235, 1997, pp. 47-53.

* cited by examiner

MICROSCOPE

CROSS REFERENCE TO RELATED APPLICATION

This application is a 35 USC § 371 National Phase Entry Application from PCT/EP02/09901, filed Sep. 4, 2002, and designating the U.S.

BACKGROUND OF THE INVENTION

This invention relates to a microscope. More particularly, this invention relates to a microscope which includes a housing, an optics system having at least one lens system which includes at least one lens, at least one observation device and an illumination device producing at least one illumination beam that strikes a microscope slide at a predetermined angle.

Such a microscope is known (*Biochemical and Biophysical Research Communications*, 235, 47–53). It is used primarily for the microscopy technique known by the acronym TIRM (=total internal reflection microscopy). In this technique, the illumination beam is totally reflected at an interface formed between the microscope slide and the object (the refractive index of the microscope slide is greater than the refractive index of the object), wherein the illumination beam traverses the microscope slide, so that an evanescent light field originating from the point of reflection penetrates into the object, with the intensity declining exponentially. This light field is used for strictly locally delimited illumination of areas of the object near the microscope slide. These areas may then be examined in the usual way through the optics system and the observation device, e.g., an ocular or a camera.

In one of two possible TIRM configurations, the object is on the side of the microscope slide facing the microscope with a corresponding guide for the illumination beam in the manner of a back-lighting configuration (see, for example, *Nature*, vol. 374, pp. 555–559 or *Topics in Fluorescence Spectroscopy*, vol. 3, ed. by J. Lakowicz, Plenum Press, New York, 1992, p. 314 ff.). The alternative reflected light arrangement, in which the object is situated on the side of the microscope slide facing away from the microscope, is used in the related art cited in the preamble. The illumination light here emanates from a laser outside of the passage in the microscope and is directed via a mirror system at a dichroic beam splitter mirror in the passage and then follows the path of the observation beam in parallel with the optical axis through the optics system (objective) to the microscope slide and the object. The dichroic mirror interferes with microscopic observation of the object because it passes through the entire cross section of the passage and thus weakens the light beam observable through the ocular in a ratio that depends on the wavelength.

SUMMARY OF THE INVENTION

The object of this invention is to provide a microscope of the type defined in the preamble so that it causes the least possible impairment in microscopy possibilities, in particular with regard to the possible wavelengths of the illumination light and/or the observation light.

This object is achieved by the fact that said at least one illumination beam emanating from said plane of incidence is provided by an optical device whose cross section in the area of said passage is much smaller than the Gross section of said passage.

The position of the plane of incidence may be selected as desired in the passage between the front lens of the optics system (objective) and the observation device, with lateral coupling into the front lens also being possible. Due to the fact that the illumination light is concentrated on at least one illumination beam, locally limited beam guidance elements may be used accordingly, which cause only minor impairment in the observation beam path of the microscope (usually outside of the optical axis). This fine illumination beam may be passed through the lens system traversed by the beam (optionally the front lens) of the optics system without requiring any additional measures. In particular, for coupling of the illumination light it is possible to omit the use of any beam splitting equipment extending through the passage.

A light source for the illumination light might be, for example, a laser which emits an illumination beam bundle of parallel individual beams with an essentially spot-shaped beam cross section. However, it is preferred that in the focal plane facing the observation equipment hereinafter also referred to as the back focal plane, of the lens system traversed by the beam of the optics system said at least one illumination beam is virtually or actually focused at the point. This achieves the result that the illumination beam emitted from the point in the focal plane as a divergent beam bundle is formed by a beam bundle of individual beams running in parallel after passing through the lens system, all of the individual beams meeting the condition of total reflection equally.

The illumination beam could in principle also pass through the lens system of the optics system at an inclination to the optical axis. However, it is preferable for the at least one illumination beam to run essentially parallel to the optical axis through the lens system traversed by the beam of the optics system. The illumination beam here may fall outside of the optical axis as well as along the optical axis through the lens system traversed by the beam of the optics system. The greater the distance from the optical axis in the radial direction where the illumination beam strikes the lens system of the optics system, the greater is the angle of reflection of the illumination beam at the interface between the microscope slide and the object. To meet the condition of total reflection, one would therefore preferably select an arrangement in which the illumination beam runs near the edge of the aperture diaphragm of the optics system through the lens system traversed by the beam of the optics system. A special application is obtained when the illumination beam traverses through the lens system traversed by the beam of the optics system at the center of the passage along the optical axis. In this case, the illumination beam strikes the interface between the microscope slide and the object essentially at a right angle, so that it is reflected back into the microscope along the same path. In this way it is possible to implement a microscope having a reflected light configuration in which the light reflected back from the object can be observed without having to use beam splitter equipment which would interfere with the observation light, because only a small area at the center of the field of vision of the microscope is included with the device providing the illumination beam In an especially preferred embodiment, the at least one illumination beam is displaceable in the radial direction with respect to the optical axis. The lateral displacement can be implemented through technically simple means, in particular through deflector mirrors, deflector prisms or the like, all of which are displaceable in the radial direction (with respect to the optical axis). A displacement in the radial direction leads directly to a corresponding change in the angle of reflection at the interface between the microscope slide and the object. The total reflection angle, which varies from one case to the next (depending on the refractive indices of the microscope slide and the object) can be adjusted in any desired manner. In addition, the depth of penetration of the light field into the object behind the interface on which the total reflection occurs depends on the angle of incidence of the light beam. The depth of the illuminated object volume can thus be altered by radial displacement of the illumination beam. In addition, the depth of the illuminated volume can also be varied by choosing illumination light of a different wavelength. Since the inventive microscope allows the use of illumination light of any wavelength, a continuous variation in the illuminated object volume is also possible in this way. A targeted change in the illuminated object volume and observation of the intensity of the light emitted by this volume can be utilized for example, to determine the size of an object in the area of this object volume, because the depth of penetration of the illumination light can be calculated from its wavelength and the total reflection angle set (see in this regard, for example, *Topics in Fluorescence Spectroscopy*, vol. 3, Plenum Press, New York, 1992, pp. 289 ff.).

Furthermore, it is proposed that the angle of divergence of the at least one illumination beam emitted from the plane of incidence shall be variable. A change in the angle of divergence results in a corresponding change in the cross section of the illumination beam emitted from the lens system and thus also a change in the size of the illuminated area in the object.

The angle of divergence can be varied according to the invention by adjusting an aperture diaphragm in the beam path of the illumination beam or by varying the focal depth of the optical unit focusing the illumination beam in the back focal plane.

If an as uniform as possible illumination of the object is required, then preferably an incoherent illumination beam is used. However, if an increased positional resolution and/or structured illumination is desired, then preferably one or more essentially coherent illumination beams is used, with the possibility of interference in the area of the object.

If the object to be observed is in the area of the optical axis, as is generally the case, the totally reflected component of the illumination beam is then reflected back into the optics system, at least when the microscope slide is arranged perpendicular to the optical axis. Normally, with TIR microscopy, fluorescent light is observed emanating from the illuminated part of the object and containing information about the object. In order not to interfere with microscopic observation of the object, the portion of the illumination beam reflected back, i.e., the reflected beam, is absorbed according to this invention, preferably through an absorber or a filter directly downstream from the lens system traversed by the beam. Alternatively or additionally, the reflected beam may also be detected, whether for adjustment of the arrangement, in particular for adjusting the total reflection angle, and/or for absorption measurements on the object. A detection device may be provided in the area of the passage for this purpose. Through the observation of absorption processes at the interface between the microscope slide and the object as a function of the wavelength of the illumination beam used, additional information about the object can also be obtained from the reflected beam. It is important in particular here that light of any wavelength can be observed, as is the case according to this invention.

Greater freedom in the configuration and design of the detection device are obtained when the reflected beam is guided out of the microscope beam path by means of a deflecting unit in the area of the passage. A corresponding deflecting unit may also be provided for coupling of the illumination beam into the microscope. Here again, the advantage of a greater freedom in the arrangement and design of the light source and the beam guidance is achieved by means of corresponding optical systems of the illumination device. Nonetheless it may be advantageous in certain situations, e.g., when not enough room is available for external light sources, to place a light source with a spot-shaped cross section if possible, e.g., a laser diode, directly in the passage in the area of the plane of incidence.

In a first embodiment of this invention, the deflecting unit includes a prism. Deflection is then accomplished by total reflection on one of the prism faces. The prism causes very little interference with the observation field of the microscope. It can be held and mounted in a simple manner. A movable mount for adjusting the beam path, in particular for adaptation of the reflection angle by displacement in the radial direction, can be implemented with little structural complexity. Thus, for example, it is possible to use a rod prism having a deflection prism face in the passage with linear movement guidance and mounting outside of the passage.

Prisms are available in different shapes and designs, depending on the desired specifications. A 90° prism is used in the basic version. The prism may be rounded so as to interfere with the field of observation as little as possible. Instead of the 90° configuration, other angles may also be selected. Coupling an optical lightguide to a deflection prism offers special advantages with regard to flexibility in introducing the illumination beam.

In cases in which dispersion of the illumination beam is to be prevented or the wavelength of the illumination beam is varied, then instead of the prism, a deflecting mirror may also be used. In general, a planar deflecting mirror will be used. However, it is also conceivable to use a curved mirror, which can be useful in focusing the beam in the back focal plane, so that corresponding lens elements may be omitted.

In the inventive configuration, at least one illumination beam is used, and a plurality of illumination beams may also be used, depending on the particular requirements. In such a case, a deflecting unit in which a corresponding plurality of deflecting units is structurally integrated is also used to advantage. In this case, the deflecting unit is preferably designed to be approximately ring-shaped and is arranged so that it is concentric with the optical axis. Suitably inclined reflection surfaces (mirror surfaces and/or prism surfaces) are provided on this ring in addition, it is also possible to introduce the illumination beam into the beam path of the microscope by using a curved optical lightguide. In this case the deflecting unit is formed by the curved optical lightguide itself.

The configuration according to this invention, comprising individual illumination beams, in particular a single illumination beam, makes it possible to illuminate the object with an illumination beam coming from a single direction. In the case of designs having a complex three-dimensional structure, such as cells, different images of the object may be obtained, depending on the angle of incidence of the illumination beam. This provides additional information regarding the object. Therefore in such a case, it may be advantageous if, as proposed according to this invention, the at least one deflecting unit or the light source (if a light source is situated in the passage) is able to rotate about the optical axis. To detect or absorb the reflected beam, it is also expedient to rotate the detection device and/or the absorption device about the optical axis, if necessary.

Rotation of the deflecting unit and thus rotation of the illumination beam striking the specimen may be performed between measurements, as mentioned above, or even during a measurement in order to obtain uniform illumination of the object.

Since the illumination light is coupled into the microscope only in the area of the optics system via the at least one deflecting unit according to this invention and if necessary is also output again there, the light that serves to illuminate the object and is not part of the reflected beam and nevertheless is reflected and/or scattered back into the microscope can be removed easily from the observation beam path, namely by a filter arrangement on the side of the at least one deflecting unit that is remote from the object.

The restriction on the beam guidance of the illumination beam according to this invention as well as that of the reflected beam to the optics system area permits the use of an adapter, which is situated between the optics system and the observation device and has at least the one deflecting unit or the one light source, if necessary. With the help of the adapter, it is readily possible to couple the light source of the illumination device, wherein the light source (in the case when it is not situated in the passage) may be independent of the adapter or may also be integrated into the adapter. The adapter can optionally be removed again or replaced by other adapter devices, which allows versatile use of the microscope. Existing microscopes can be upgraded or modified by replacing adapter inserts that are traditionally present, in particular so-called DIC (differential interference contrast) sliders which have optical components that are used for DIC microscopy, with an adapter according to this invention. Another simple possibility of modifying existing microscopes is provided by an adapter situated between the optics system and the optics system connection of the microscope housing. Ideally such an adapter has a connection on its side facing the optics system similar to the optics system connection of the microscope housing into which the optics system normally fits. In addition, it is advantageous if the adapter has a similar connection on its side facing the microscope housing like the connection of the optics system facing the microscope housing. In this case, the adapter can easily be inserted into the passage between the optics system and the microscope housing without having to modify an existing microscope, because in a microscope, the length of the passage between the observation device and the connection of the microscope housing on the optics system end can usually be varied.

It is even possible to integrate the deflecting unit into a suitably adapted optics system. The optical components can thus be optimally coordinated. Furthermore, no other modification of the microscope is necessary, because one need only replace a traditional optics system with an optics system according to this invention.

In addition to the deflecting unit, the light source and/or the detector unit for the reflected beam may also be integrated into the adapter box and/or the optics system according to this invention.

BRIEF DESCRIPTION OF THE DRAWINGS

This invention is explained below on the basis of several exemplary embodiments with reference to the drawing, showing.

DETAILED DESCRIPTION

Figure 1:
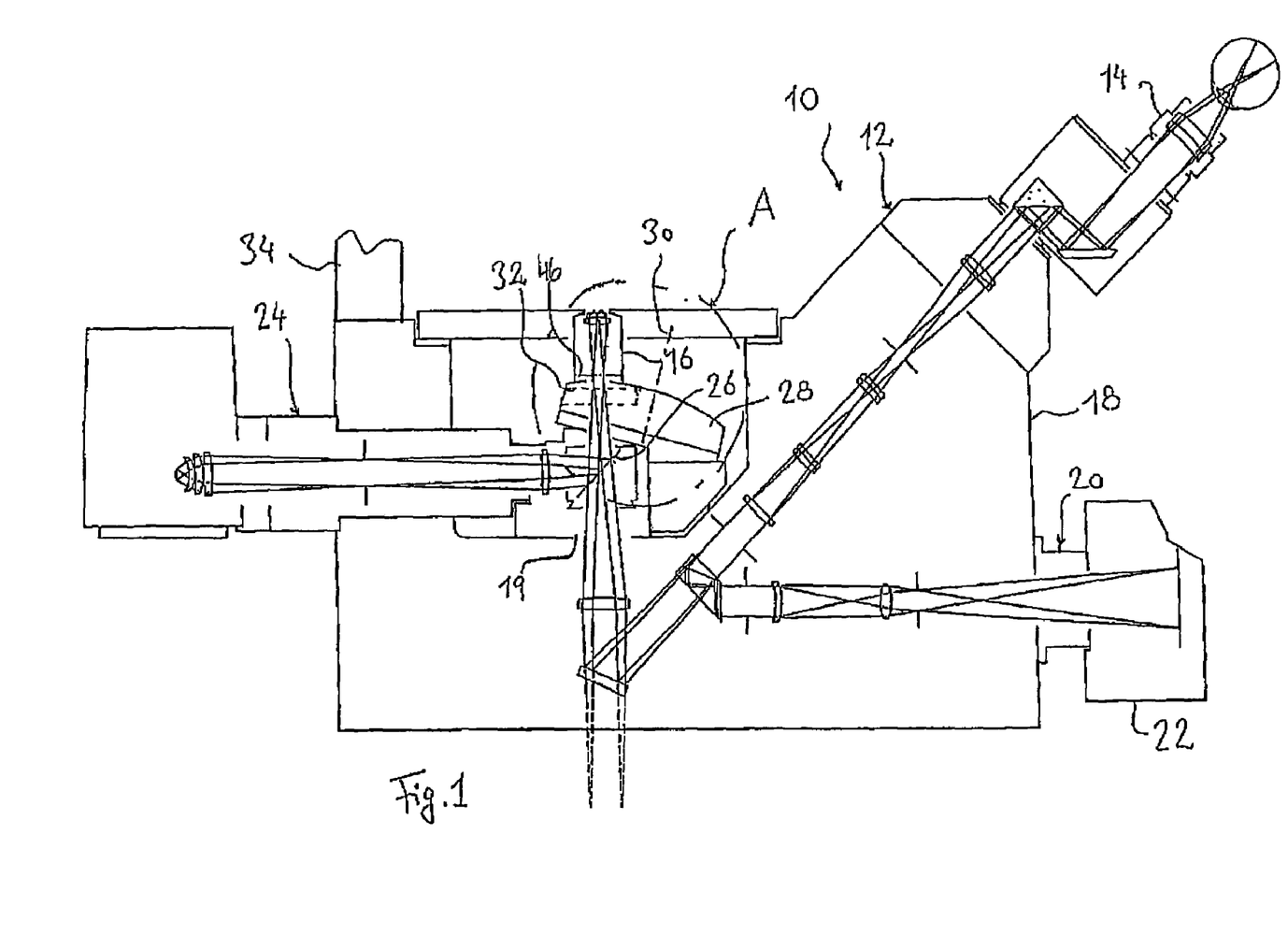
FIG. 1 a roughly schematic sectional diagram of a microscope having a reflected light configuration and an adapter, the adapter being indicated with dotted lines.

The schematic sectional drawing according to FIG. 1 shows a traditional microscope in an inverted configuration (Carl Zeiss Axiovert 100, 135, 135M, Carl Zeiss Jena). The main parts of the microscope, which is labeled as 10 in general can be seen here, namely a visual observation part 12 with an ocular 14 at one end of the beam path and an optics system (objective) 16 on the other end and a plurality of optical components inserted in between within a passage 19 of a microscope housing 18. The beam path of a photographic observation part with a camera 22, the outline of which is shown here, can be coupled into the beam path.

Furthermore, the beam path of an illumination part 24 can be coupled into the visual beam path (via a partially transparent mirror 26 beneath an optics system revolver head 28 which carries the optics system 16 with the axis of rotation 30 of the revolver).

With the traditional microscope 10, an adapter receptacle 32 (indicated with dotted lines in FIG. 1) is provided, serving to accommodate adapters (DIC sliders), in particular a Wollaston prism for observation of objects in differential interference contrast.

In FIG. 1, a microscope slide (omitted in FIG. 1) for the object to be observed with the microscope is connected to the optics system 16 at the top. In the arrangement shown here, the object is illuminated by the illumination part from the observer's side. If transillumination of the object is desired, then an illumination part (not shown in FIG. 1) for a corresponding illumination of the sample (from above in FIG. 1) may be arranged on a mount 34 which protrudes upward from the microscope 10 and is shown in a cutaway view in FIG. 1.

Figure 2:
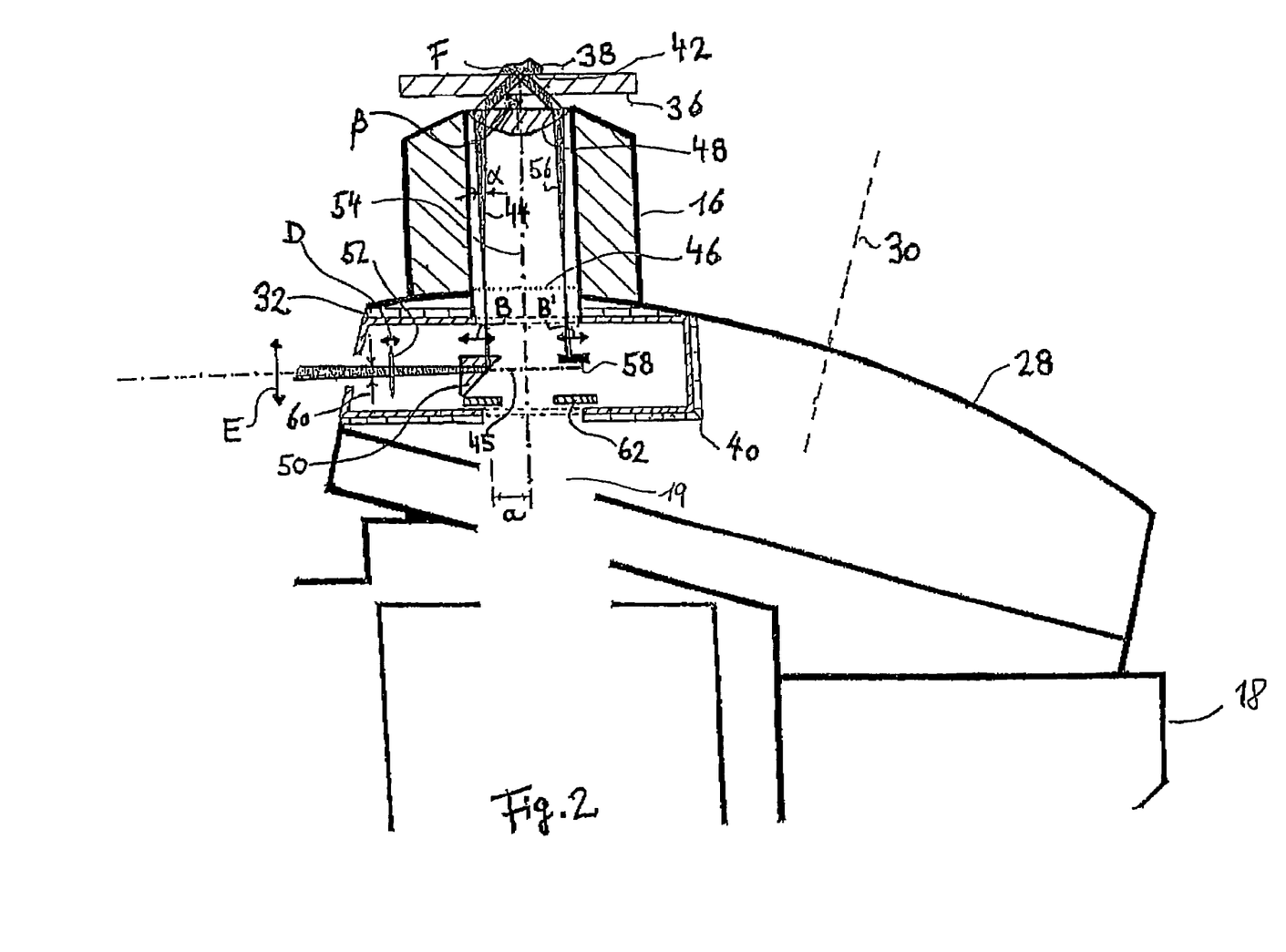
FIG. 2 a detailed view (arrow A) of the configuration in FIG. 1 with an embodiment of an adapter designed according to this invention and an external light source (not shown)

The area of the revolver head 28 indicated by the circular area A in FIG. 1 is shown in FIG. 2 together with the microscope slide 36 and the object 38 on its top side (side of the microscope slide 36 formed by a glass slide facing away from the optics system 16).

An adapter 40 according to this invention is inserted instead of a traditional adapter into the receptacle 32. This adapter 40 can thus be used without further modification of the known microscope 10. It is used to illuminate the object 38 according to the essentially known principle of TIR (total internal reflection) microscopy.

In this microscopy technique light, coming from the microscope slide side is totally reflected at an interface 42 formed between the microscope slide 36 and the object 38 (refractive index of the object lower than the refractive index of the microscope slide). A so-called evanescent illumination field extends from the total reflection point into the object, declining exponentially with the distance from the interface. This yields a type of illumination which is very sharply delimited locally in the axial direction. To obtain the total reflection angle, an optics system having a sufficiently high numeric aperture NA is used. For example, in the case of a glass-water interface, an optics system with a high numeric aperture (NA>1.33) must be used to obtain the total reflection angle.

The depth of penetration of this field depends on the particular reflection angle $\beta$ (which continues to obey the total reflection condition). Accordingly, by varying the reflection angle $\beta$ the depth of illumination can also be varied.

According to this invention, an illumination beam 44 having a greatly limited cross section is used. The limitation is such that it essentially forms a spot in the back focal plane 46 of the optics system 16. This refers to the focal plane which corresponds to the lens system of the optics system 16 through which the illumination beam 44 passes (indicated by a single front lens 48 in FIG. 2). Therefore, depending on the design of the optics system 16, other lenses or lens systems of the optics system 16 may also be situated downstream from the coupling point (prism 50) of the illumination beam 44 (in the direction of the ocular).

When using a precision laser beam as the illumination beam 44, it can be passed through the lens system on the front (represented by the front lens 48) without using focusing lenses, although a weak divergence of the beam emitted from the front lens is unavoidable, because the partial beams which are still parallel in front of the front lens then converge in the form of rays toward the focal point F. Accordingly, the reflection angles of these partial beams differ slightly from one another. In many cases, this may be acceptable.

Theoretically absolute parallelism of the partial beams after passing through the front lens 48 of the optics system is obtained when the illumination beam is focused into the back focal plane 46 (on the ocular end) with the help of corresponding optical elements (indicated by a lens 52 in FIG. 2). Then after the beam passes through the front lens 48, this necessarily results in parallel partial beams of the illumination beam 44 with a joint reflection angle $\beta$ corresponding to the distance A of the partial beam 44 from the optical axis 54 of the optics system 6. The degree of divergence of the illumination beam 44 after passing through the front lens 48 is determined by the divergence angle $\alpha$ of the illumination beam 44, which is focused in the back focal plane 46.

With the help of the prism 50 mentioned above, the illumination beam coming from an illumination source (not shown; left of the revolver head 28 in FIG. 2) is deflected at a right angle so that it runs parallel to the optical axis 54 and at a distance a from it. The cross section of the prism 50 in the passage 19 is significantly smaller than the total cross section of the passage 19. For this reason, it is not necessary to use a beam splitter such as a dichroic mirror which allows transmission of the observation light coming from the object for coupling of the illumination beam because only a small portion of the observation field of the microscope is covered by the prism 50. The distance a may be varied according to this invention in an especially simple manner by shifting the prism 50 either in the direction parallel to the optical axis 54 or, as depicted here, in the radial direction (double arrow B). The reflection angle $\beta$ of the illumination beam 44 changes with the distance a, and thus after exceeding the total reflection angle, the depth of penetration into the object also changes. In order for the focus of the illumination beam 44 to still be in the focal plane 46 after displacement of the prism 50, the position of the optical components provided in the beam path (represented by the lens 52) must accordingly be adjusted. If, as shown in FIG. 2 the illumination beam is deflected at a right angle, it is particularly advantageous to mount the deflecting unit and the optical elements which permit focusing on a shared mount because only this mount need be displaceable in the radial direction.

In the arrangement shown in FIG. 2 with the interface 42 at a right angle to the optical axis 54 between the microscope slide 36 and the object 38, the illumination beam again passes through the front lens 48 into the optics system 16 (symmetrical with the illumination beam 44) after being reflected on the interface 42 (now called the reflected beam 56). In order for the reflected beam 56 not to interfere with microscopic observation of the object 38, it is absorbed by an absorber 58 in the embodiment according to FIG. 2, said absorber being situated here on the other side of the optical axis 54 at a location corresponding to the location of the prism 50. To interfere with microscopic observation as little as possible, the absorber 58 may be moved radially outward as much as possible; as indicated by the double arrow B'.

The aperture diaphragm 60 in front of the lens 52 should also be mentioned, because the aperture diaphragm limits the beam cross section of the illumination beam 44 and thus via the divergence angle $\alpha$ determines the degree of divergence of the illumination beam 44 after the beam passage through the front lens 48. Another possibility of varying the divergence angle $\alpha$ consists of varying the focal depth of the lens 52, in which case then the position of the lens 52 (see double arrow D) and optionally the joint position of lens 52 and prism 50 must then be readjusted in the axial direction (see double arrow E) so that the illumination beam is still focused in the back focal plane 46.

In case of need, the adapter 40 can be removed from the receptacle 32 again and optionally replaced by a conventional adapter. Furthermore, the adapter may also easily be used in combination with any other optics systems of the revolver head 28, because a receptacle 32 is usually assigned to each optics system.

With regard to the optical structure, it should also be added that an additional aperture diaphragm 62 (indicated beneath the prism 50 in FIG. 2) may also be used in the passage 19 between the coupling point of the illumination beam (prism 50) and the observation device. This aperture diaphragm removes the prism 50 from the observation beam path and thereby prevents any interfering asymmetrical diffraction images (image distortion) of the object due to the prism 50 introduced into the illumination beam path. The slightly reduced numeric aperture and resolution are then acceptable.

Another variation in the type of illumination of the object 38 can be achieved if the prism 50 together with the optical components (lens 52) connected in front is shifted in parallel with the optical axis 54. If the focus then moves out of the back focal plane 46, the result is a certain divergence of the beam striking the interface 42 and a change in the degree of divergence.

Figure 3:
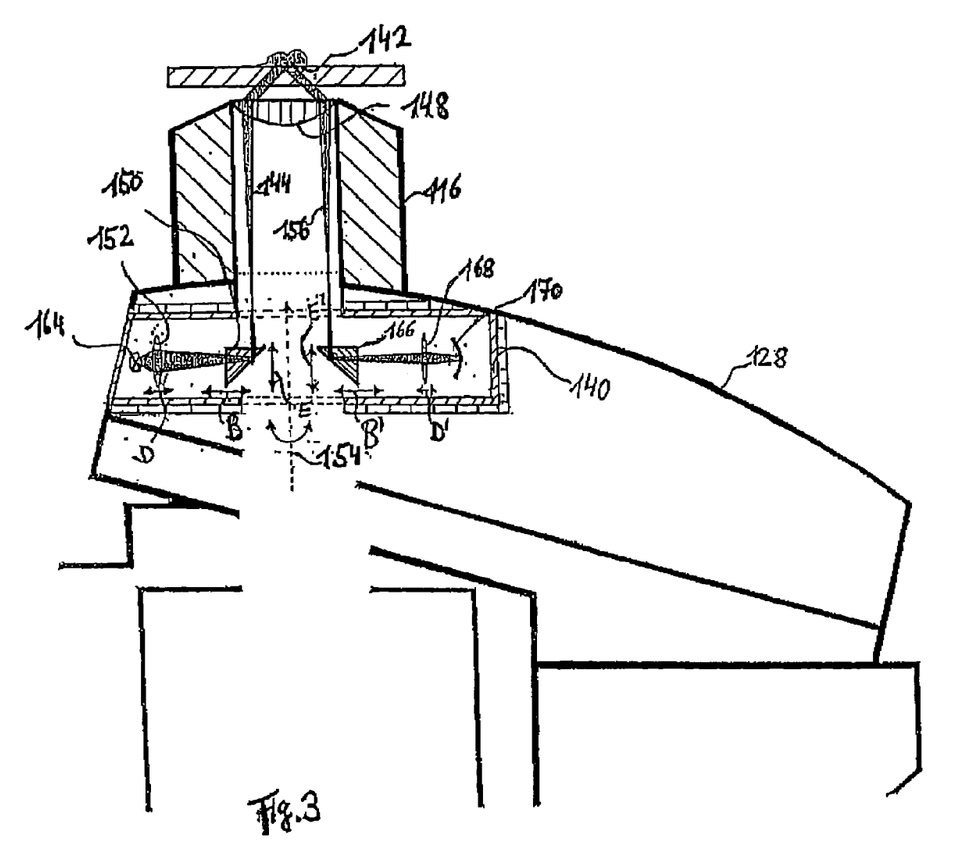
FIG. 3 a view according to FIG. 2 of a modified adapter with an internal light source.

FIG. 3 shows another embodiment (labeled as 140) of the adapter 40 according to FIG. 2. Accordingly, the other components, inasmuch as they correspond to components of the adapter 40, are provided with the same reference numbers, but each has the number 100 added to it.

In contrast with the adapter 40 having the external light source, the light source 164 with the adapter 140 is integrated into the adapter 140. The lens 152 and the prism 150 are connected thereto. After passing through the front lens 148 of the optics system 116 and after total reflection at the interface 142, the illumination beam 144 and/or the reflected beam 156 is deflected by 90° through another prism 166 (diametrically opposite the prism 150 together with the light source 164) and is captured in a detector 170 after passing through a lens 168. With the detector 170, the optical arrangement can now be adjusted in a targeted manner; in particular, the total reflection angle can be adjusted as a function of the position of the prism 150 and a desired range after exceeding the total reflection angle can be set. On the other hand, under some circumstances local changes in refractive index, absorption processes or the like can be detected in the area of the interface 142. Variation of the wavelength of the light of the light source 164 is also conceivable here.

The radial adjustability of the prisms 150, 166 is indicated by the double arrows B and B'; the mobility of the prisms 150 and 166 together with the light source 164 and the lens 152 and/or the detector 170 and the front Jens 168 in parallel with the optical axis 154 is indicated by the double arrows E and E'; the adjustment mobility of the lenses 152, 168 is indicated by the double arrows D, D'.

In principle, it is also conceivable to design the adapter 140 so that it can optionally be rotated about the optical axis 154. This offers the advantage that in the case of objects having anisotropic optical properties, the incident beam direction of the observation beam 144 may optionally be varied. Uniform illumination of the object can also be achieved optionally by rotation during the measurement.

Figure 4:
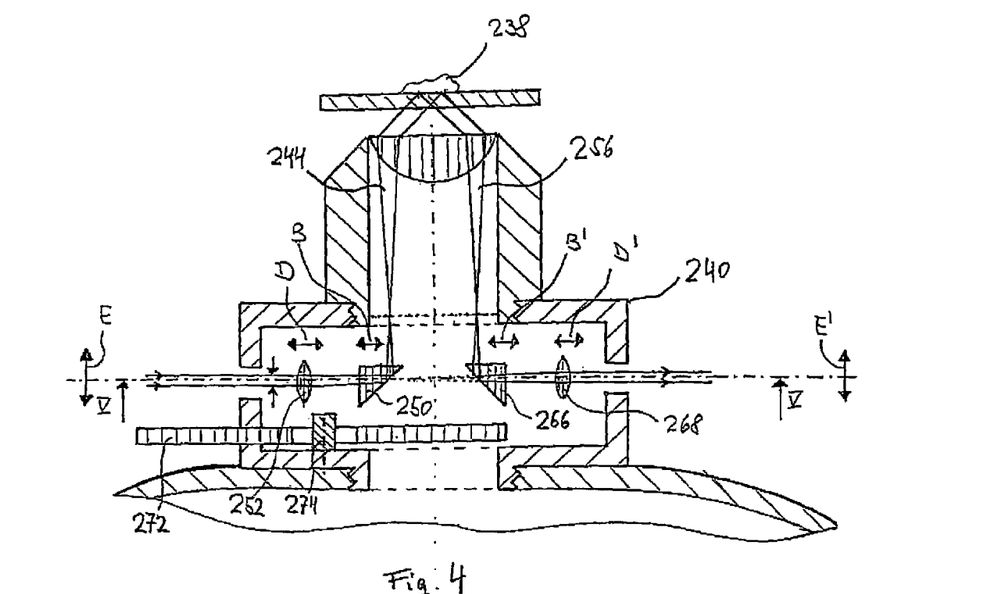
FIG. 4 a sectional view like those in FIGS. 2 and 3 of another embodiment of the adapter together with the optics system, omitting the other microscope components and including a prism as the deflecting unit.
Figure 5:
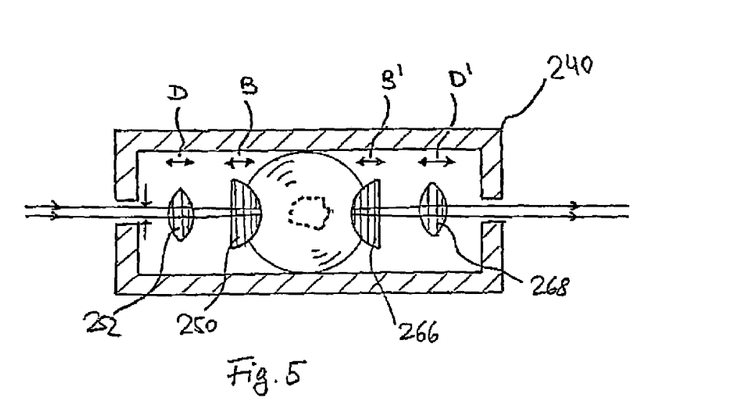
FIG. 5 a section of the configuration according to FIG. 4 according to line V—V in FIG. 4.

FIGS. 4 and 5 show another embodiment of the inventive adapter, now labeled as 240, shown here in a side view and a sectional view. Its components, which correspond in function to those in FIG. 3, are labeled with the same reference numbers, each increased by 100.

Here again, the prisms 250, 266 with the lenses 252, 268 connected in front are provided for coupling of the illumination beam 244 and/or for output of the reflected beam 256. In contrast with the embodiment according to FIG. 3, the reflected beam 256 is guided out of the adapter 240 and sent to a detection device (not shown here). The light source (also not shown here) is outside of the adapter 240 (in accordance with FIG. 2). The adjustment options are the same here as those in the embodiment according to FIG. 3, which is indicated by the corresponding double arrows D,D', B, B' and E, E'.

The adapter 240 is situated between the optics system 216 and the revolver head 228. On its side facing the optics system, it has a connection 290, which corresponds to the optics system connection 292 of the revolver head 228 into which the optics system 216 is normally inserted. On its side facing the revolver head 228, the adapter 240 has a connection 286, which corresponds to the connection 288 on the ocular end of the optics system 216, which is normally fitted into the optics system connection 292 of the revolver head 228. In this way, the adapter 240 can easily be integrated into an existing microscope without having to modify the microscope.

The two prisms 250, 266 have rounded reflective surfaces so as to interfere with microscopic observation as little as possible (see FIG. 5). In addition, a filter wheel 272 with an axis of rotation 274 in the observation beam path is situated in the adapter 240 on the side of the prisms 250, 266 facing away from the object 238. Thus, for example, the portions of the illumination beam 244 which are not output as reflected beam 256 out of the adapter 240 (in particular diffusely scattered fractions), can be filtered out of the observation beam path. This is advantageous in fluorescence measurements in particular.

Figure 6:
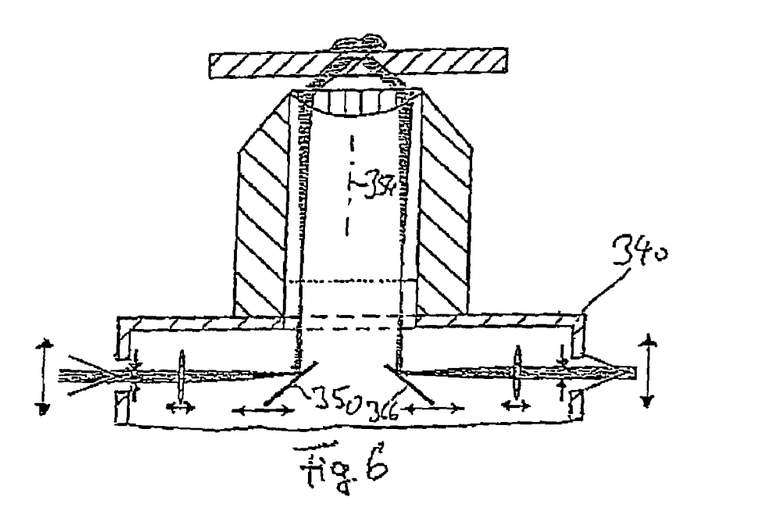
FIG. 6 a section like that in FIG. 4 through another embodiment of the adapter, omitting a part of the adapter that is remote from the object and having a mirror as the deflecting unit.

The embodiment of the inventive adapter shown in FIG. 6 is labeled as 340. It differs from the embodiment according to FIGS. 4 and 5 only in that the prisms 250, 266 have been replaced by planar mirrors 350, 366. The total reflection angle can be varied in the same way when using a prism due to the displacement of the mirror 350 in a direction perpendicular to the optical axis 354 (while retaining the three-dimensional orientation).

Figure 7:
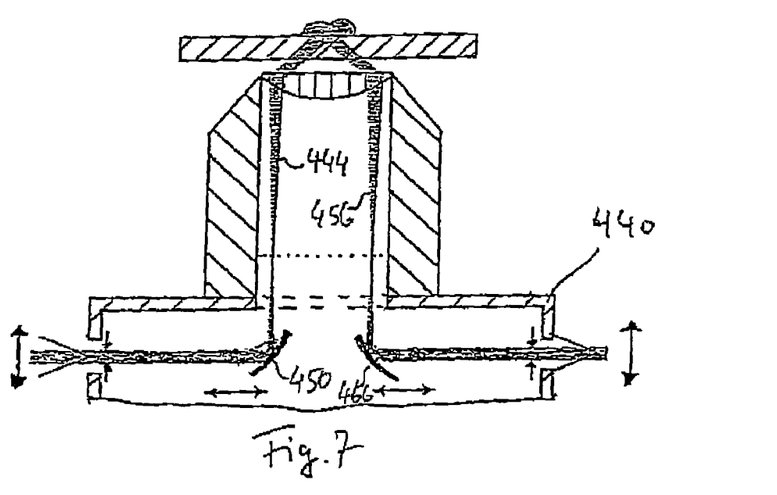
FIG. 7 a view like that in FIG. 6 shows another embodiment of the adapter with a curved mirror as the deflecting unit.

In the embodiment labeled as 440 of the adapter according to FIG. 7, the two planar mirrors 350, 366 according to FIG. 6 have been replaced by curved mirrors, in particular concave mirrors, also called concentrating reflectors 450, 466. Under some circumstances, coupling and focusing of the illumination beam 440 can be accomplished according to the exemplary embodiments described above without requiring other optical elements such as a front lens. Beam guidance of the reflected beam 456 through the mirror 466 is accomplished symmetrically here.

Figure 8:
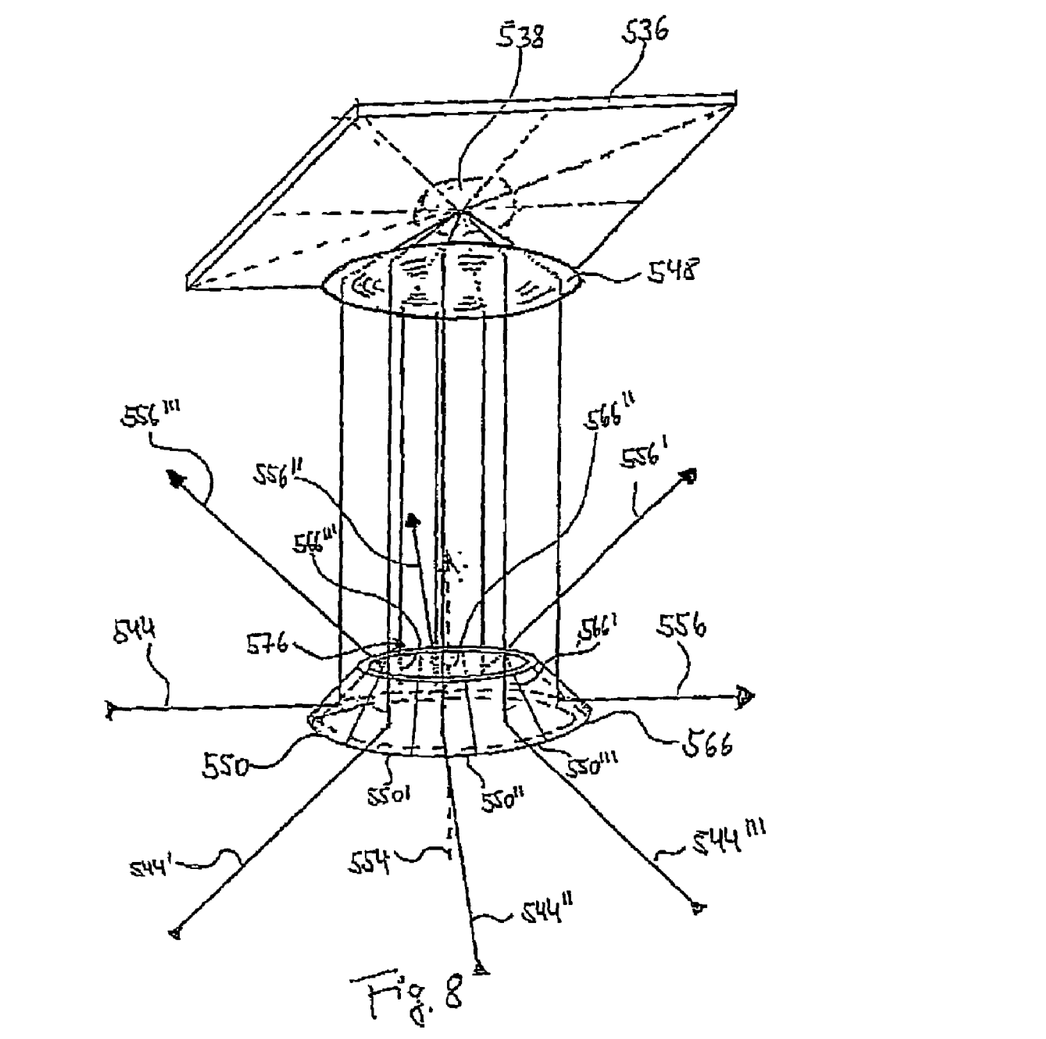
FIG. 8 a greatly simplified perspective schematic view of a deflecting unit of concentrically arranged deflecting elements arranged in a ring together with the lens system, represented by a single lens, and the microscope slide with the object and the beam path indicated.

In a highly simplified, perspective, schematic view, FIG. 8 shows a deflecting unit 576 which is used for coupling of a plurality of illumination beams 544, 544', 544", 544'" and for output of the corresponding reflected beams 556, 556', 556", 556'".

The deflecting unit 576 consists of a concentric arrangement of deflecting elements held together in the shape of a ring, depicted in FIG. 8 as trapezoidal mirrors 550, 550', 550', 550", 566, 566', 566", 566'". An illuminating beam, e.g., labeled with the reference number 544, is reflected here on the particular deflecting element, e.g., 550, so that it runs parallel to the optical axis 554 after reflection and is imaged by the optics system 548 on the microscope slide 536 with the object 538. The illumination beam, e.g., 544 totally reflected at the interface between the microscope slide 536 and the object 538 strikes the deflecting element, e.g., 566 as a reflected beam, e.g., 556 after passing through the optics system 548 again in parallel with the optical axis 554, and is reflected again at the deflecting element, so that it is output out of the beam path of the microscope. With the arrangement depicted in FIG. 8, the object 538 can be illuminated simultaneously from several directions, with each of the illumination beams 544—544''' satisfying the total reflection condition in the same way.

Figure 9:
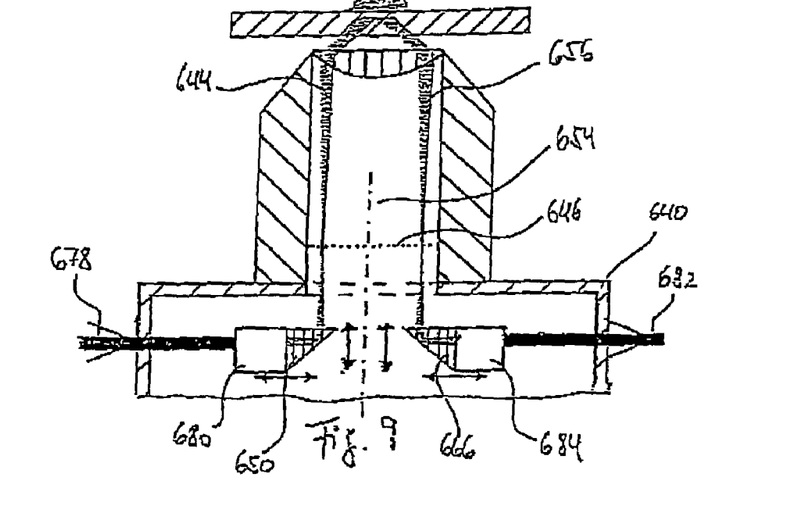
FIG. 9 a view like that in FIG. 6 with a prismatic deflecting element and an optical lightguide connected.
Figure 10:
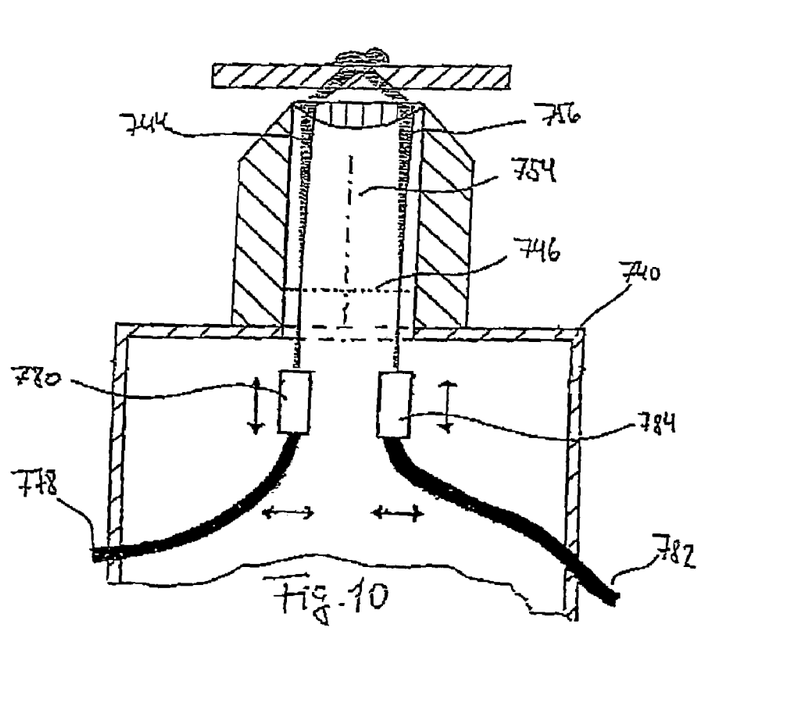
FIG. 10 a view like that in FIG. 9 with a deflecting element formed by a curved section of an optical lightguide, FIG. 11 a sectional view with a deflecting unit in the form of a rod prism integrated into the optics system.

FIGS. 9 and 10 show additional embodiments of the adapter, which was already shown in FIGS. 2–7 and is depicted here in a side view. The components of this adapter, labeled with reference numbers 640 and 740, the function of which corresponds to that of the adapter shown in FIG. 4, are labeled with the same reference numbers but in this case they are increased by the number 400 or 500 in each case.

In the embodiments of the adapter 640 and 740 shown in FIGS. 9 and 10, the illumination light is introduced into the adapters 640 and/or 740 via a lightguide 678 or 778, e.g., a glass fiber. An adapter optics 680 or 780, e.g., composed of microlenses, is connected to the lightguide 678 or 778 to focus the illumination beam 644 or 744 coming from the lightguide 678 or 778 in the back focal plane 646 or 746.

In the embodiment depicted in FIG. 9, the lightguide 678 is introduced into the adapter 640 at a right angle to the optical axis 654, so that it must be deflected in a direction parallel to the optical axis 654 by a deflecting unit, which is shown in FIG. 9 as a prism 650. On the other hand, the lightguide 778 in the exemplary embodiment depicted in FIG. 10 is curved, so that the focused illumination beam 744 leaving the adapter optics 780 is already parallel to the optical axis 754.

In both exemplary embodiments, the reflected beam 656 or 756 can be output with the help of the optical elements which correspond to those used for coupling. This is implemented in FIG. 9 by the prism 666 and the lightguide 682, which is connected by the adapter optics 684 to the prism 666. In FIG. 10 this is done through the lightguide 782 and the adapter optics 784 attached to the end thereof, and with respect to the optical axis 754, said optics are also mounted symmetrically with the adapter optics 780 used for coupling the illumination beam 744.

FIGS. 11–14 show embodiments of the present invention in which the deflecting units, which are used for coupling of the illumination beam and/or for output of the reflected beam are integrated into a special optics system (objective) 816, 916, 1016, 1116. Components whose functions correspond to those in the preceding figures are labeled with the same reference numbers in FIGS. 11–14, but each of the numbers has been increased by 100. In comparison with the embodiments in which the deflecting units are integrated into an adapter, the embodiments depicted in FIGS. 11–14 offer the advantage that the optical components required for the deflecting units can be adapted to the lens system of the optics system 816, 916, 1016, 1116, so that the quality of the optical imaging can be optimized on the whole. In addition, such special optics systems can also be used for microscopes which do not have an adapter receptacle, as depicted in FIG. 2.

Figure 11:
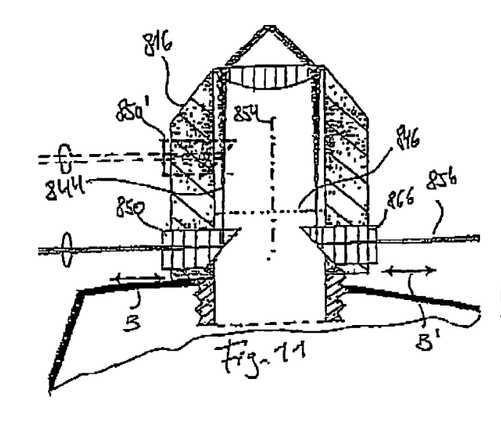

FIG. 11 shows the illumination beam 844 coupled via a rod prism 850 into the beam path of the microscope. Likewise, the reflected beam 856 is guided out of the optics system 816 via another rod prism 866. Both of the prisms 850, 866 are situated here in the area of the optics system so that they are displaceable in the radial direction for adjusting the reflection angle in the beam path of the microscope (represented by the double arrows B, B' in FIG. 11). An alternative arrangement of the rod prism 850 is shown with dotted lines in FIG. 11. In this arrangement, the rod prism 850' for coupling of the illumination beam 844 is situated between the illuminated front lens of the optics system and its focal plane 846 on the ocular end. The illumination beam 844 in this case is focused virtually on the focal plane 846 on the ocular end of the lens system through which the beam passes. This arrangement allows a particularly space-saving design of a special optics system with an integrated deflecting unit.

Figure 12:
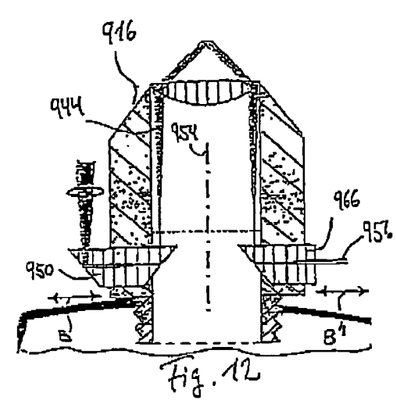
FIG. 12 a configuration like that in FIG. 11 with a deflecting unit in the form of a double prism integrated into the optics system.

In the exemplary embodiment illustrated in FIG. 12, in contrast with FIG. 11, a double prism 950 is used for coupling of the illumination beam 944, so that the illumination beam 940 can be deflected by 180°.

Figure 13:
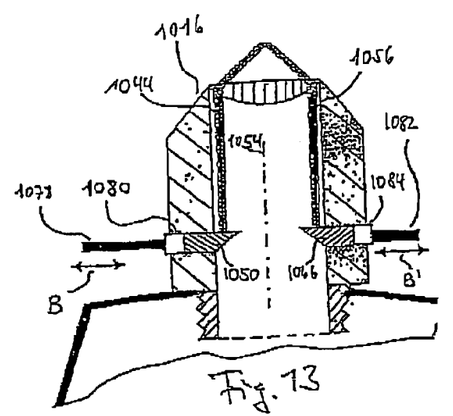
FIG. 13 a view like that in FIG. 11 with an optical lightguide connected to the rod prism, and FIG. 14 a configuration like that in FIG. 13 with a curved section of optical lightguide as the deflecting unit.
Figure 14:
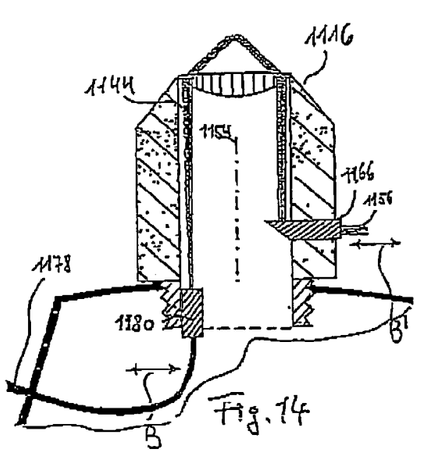

In the exemplary embodiments illustrated in FIGS. 13 and 14, lightguides 1078, 1082. 1178 are used to couple and/or output the illumination light coming from a light source (not shown) in the area of the optics system into the beam path of the microscope. In the arrangement depicted in FIG. 13, which is similar to that in FIG. 9, an adapter optics 1080 mounted on the lightguide 1078 and a prism 1050 which is connected to the adapter optics 1080 are used for coupling of the illumination beam 1040. The reflected beam 1056 is output through a prism 1066, which is situated symmetrically with respect to the optical axis 1054, and an adapter optics 1084 which is connected thereto and has a lightguide 1082 connected to it. In contrast with this, FIG. 14 shows an embodiment in which a curved lightguide 1178 is connected to the adapter optics 1180 aligned in parallel with the optical axis 1154 to couple the illumination beam 1144 into the beam path of the microscope in parallel with the optical axis.

FIGS. 1–14 illustrate various embodiments of a microscope which can be used in particular for TIR microscopy. The microscope is operated in a reflected light arrangement in which the light which is used to illuminate the object passes through at least a portion of the optics system before striking the object to be observed. The illumination beam is coupled through an optical device into the passage between the ocular and the optics system of the microscope here, the cross section of this optical device in the passage being small in comparison with the cross section of the passage. This achieves the result that it is possible to eliminate the use of beam splitter elements such as dichroic mirrors for coupling of the illumination light. A special optics system having integrated optical elements to provide the illumination beam and/or to capture or output the reflected beam may be used. As an alternative, said optical elements may also be integrated into an adapter, which can be inserted into the beam path of an existing microscope.

LIST OF REFERENCE NOTATION

A: circle (enlarged detail for FIG. 2)
F: focal point of the optics system
α: angle of divergence of the illumination beam
β: angle of reflection of the illumination beam at the interface between the microscope slide and the object
a: distance between the optical axis and the illumination beam
B, B': displacement of the deflecting unit in the radial direction
D, D': displacement of the focusing lenses in the radial direction
E, E': displacement of the deflecting unit in the axial direction
10: microscope
12: visual observation part
14: eyepiece
16: optics system
18: microscope housing
19: passage
20: photographic observation part
22: camera 24: illumination part
26: partially transparent mirror
28: revolver head of the optics system
30: revolver axis of rotation
32: adapter receptacle
34: mount (for transmitted light illumination)
36: microscope slide
38: object
40: adapter
42: interface between microscope slide and object
44: illumination beam
45: plane of incidence of the illumination beam
46: back focal plane of the optics system
48: front lens of the optics system
50: deflector unit for coupling of the illumination beam
52: lens for focusing the illumination beam
54: optical axis
56: reflected beam
58: absorber
60: aperture diaphragm in the illumination beam
62: additional aperture diaphragm on the optics system
164: light source
166: deflecting unit for output of the reflected beam
168: lens for focusing the reflected beam
170: detector
272: filter wheel
274: axis of rotation of the filter wheel
286: connection of the adapter on the ocular end
288: connection of the optics system on the ocular end
290: connection of the adapter on the optics system end
292: connection of the microscope housing on the optics system end
350: planar mirror for coupling of the illumination beam
366: planar mirror for output of the reflected beam
450: curved mirror for coupling and focusing of the illumination beam
466: curved mirror for output and focusing of the reflected beam
576: deflecting unit comprising a plurality of deflecting units
678: lightguide for coupling of the illumination beam
680: adapter optics for focusing the illumination beam
682: lightguide for output of the reflected beam
684: adapter optics for output of the reflected beam

What is claimed is:

1. A TIR microscope (10) comprising
a microscope housing (18),
an optics system (16) at one end of a passage (19) in said microscope housing (18), said optics system (16) comprising at least one lens system which includes at least one lens (48), said optics system (16) determining an optical axis (54) and an aperture of said microscope (10),
at least one observation device (14, 22), in particular an eyepiece, at another end of said passage (19),
an illumination device (24) whose illumination light forms at least one illumination beam (44) which passes through said lens system, said at least one illumination beam (44) being actually or virtually focused in the focal plane (46) facing said at least one observation device (14, 22) of said at least one lens system (48) through which said illumination beam (44) passes and striking a microscope slide (36) at a predetermined angle (13) to the optical axis (54) which is greater than zero, said angle being in the range of a total reflection angle when said illumination light strikes an interface between an object to be observed and a microscope slide, characterized in that said illumination beam, after emanating from a plane of incidence (45) which perpendicularly intersects said passage (19) between a front lens (48) located closest to the object to be detected of the optics system (16) and said observation device (14, 22), is focused in the focal plane (46) facing said at least one observation device (14, 22) of said optics system (16), and between said plane of incidence and said lens system substantially extends parallel to and at a distance from the optical axis, said focused illumination beam (44) being supplied in the plane of incidence (45) by an optical device which is located in the region of said optics system, which has a cross section in the area of said aperture which is much smaller than the cross section of said aperture and which is displaceable in the radial direction with respect to the optical axis (54).

2. The microscope (10) according to claim 1, characterized in that the cross section of said optical device providing said at least one illumination beam (44) emanating from said plane of incidence (45), said cross section being situated in the area of said aperture, is at most half as large as the cross section of said aperture.

3. The microscope (10) according to claim 1, characterized in that the cross section of said optical device providing said at least one illumination beam (44) emanating from said plane of incidence (45), said cross section being situated in the area of said aperture, amounts to at most 10% of the cross section of said aperture.

4. The microscope (10) according to claim 1, characterized in that the cross section of said optical device providing said at least one illumination beam (44) emanating from said plane of incidence (45), said cross section being situated in the area of said aperture, amounts to at most 1% of the cross section of said aperture.

5. The microscope (10) according to claim 4, characterized by at least one detection device in the area of said aperture.

6. The microscope (10) according to claim 1, characterized in that said optical device providing said at least one illumination beam (44) emanating from said plane of incidence (45) is situated outside of the optical axis (54).

7. The microscope (10) according to claim 1, characterized in that the divergence angle (a) of said at least one illumination beam (44) emanating from said plane of incidence (45) is variable.

8. The microscope (10) according to claim 7, characterized in that an adjustable aperture diaphragm (60) is arranged in the beam path of said at least one illumination beam (44).

9. The microscope (10) according to claim 7, characterized in that the focal depth of an optical device (52) focusing said illumination beam (44) in said focal plane (46) facing said at least one observation device (14, 22) is variable.

10. The microscope (10) according to claim 1, characterized in that said at least one illumination beam (44) is essentially coherent.

11. The microscope (10) according to claim 10, characterized in that at least two illumination beams (44) cause interference in the area of an object (38).

12. The microscope (10) according to claim 1, characterized in that said at least one illumination beam (44) is incoherent.

13. The microscope (10) according to claim 1, characterized in that the fraction of said at least one illumination beam (44) reflected back in the area of said object (38), i.e., the reflected beam (56), is absorbed.

14. The microscope (10) according to claim 13, characterized by at least one absorber (58) for said reflected beam (56) in the area of said passage (19).

15. The microscope (10) according to claim 1, characterized in that the fraction of said at least one illumination beam (44) that is reflected back in the area of said object (38), i.e. the reflected beam (56), is detected.

16. The microscope (10) according to claim 1, characterized by at least one light source in the area of said aperture.

17. The microscope (10) according to claim 1, characterized by at least one deflecting unit (50, 66) in the area of said aperture.

18. The microscope (10) according to claim 17, characterized in that said at least one illumination beam (44) is coupled into said aperture by said at least one deflecting unit (50).

19. The microscope (10) according to claim 17, characterized in that said reflected beam (56) is output out of said aperture by said deflecting unit (66).

20. The microscope (10) according to claim 17, characterized in that said at least one deflecting unit (50, 66) includes a prism (150, 166).

21. The microscope (10) according to claim 20, characterized in that said prism (650, 666) is connected to a lightguide (678, 682).

22. The microscope (10) according to claim 17, characterized in that said at least one deflecting unit (50, 66) includes a mirror (350, 366).

23. The microscope (10) according to claim 17, characterized in that said at least one deflecting unit (50, 66) includes a curved mirror (450, 466).

24. The microscope (10) according to claim 17, characterized in that said at least one deflecting unit (50, 66) includes a curved lightguide (778, 782).

25. The microscope (10) according to claim 17 characterized in that a deflecting unit (576) into which at least two deflecting units (50, 66) are integrated is provided.

26. The microscope (10) according to claim 25, characterized in that said deflecting unit (576) is designed to be approximately ring-shaped and is arranged concentrically with the optical axis (54).

27. The microscope (10) according to claim 17, characterized by a rotational device for said illumination beam (44).

28. The microscope (10) according to claim 17, characterized by an aperture diaphragm (62) in said passage (19) on the side of said plane of incidence (45) facing said at least one observation device (14, 22), for removing said at least one deflecting unit from the observation beam path.

29. The microscope (10) according to claim 17, characterized by a filter arrangement (272) facing, with respect to said plane of incidence (45), the side of said at least one observation device (14, 22).

30. An adapter (40) for a microscope according to claim 1, characterized in that said adapter (40) can be inserted into said passage (19) in said microscope housing (18) between said optics system (16) and said observation device (14, 22) and includes at least one optical device which provides said illumination beam (44).

31. The adapter (240) according to claim 30, characterized in that said adapter (240) can be inserted between said optics system (16) and an optics system connection of said microscope housing (18).

32. The adapter (40) according to claim 30, characterized in that said adapter (40) can be inserted into a receptacle (32) of said microscope housing (18) which is provided for other optical elements, in particular those used for DIC microscopy.

33. The adapter (40) according to claim 30, characterized in that at least one optical element is integrated into said adapter (40).

34. An optics system (816, 916,1016,1116) for a microscope (10) according to claim 1, characterized in that said optics system (816, 916, 1016, 1116) includes said at least one optical device which provides said illumination beam (44).

35. The optics system (816, 916, 1016, 1116) according to claim 34, characterized in that at least one optical element is integrated into said optics system (816, 916, 1016, 1116).

* * * * *